Aug. 20, 1968 J. F. STEPHENS 3,397,777
EMBOSSED SLAB OF GLUE
Filed June 7, 1965
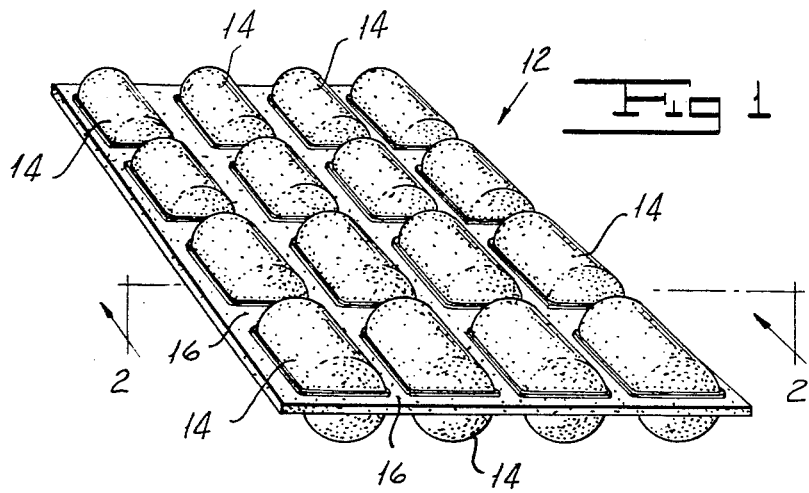
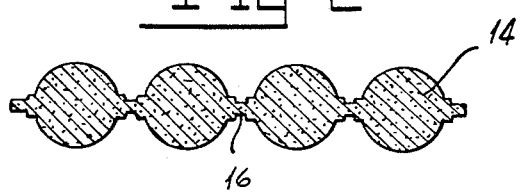
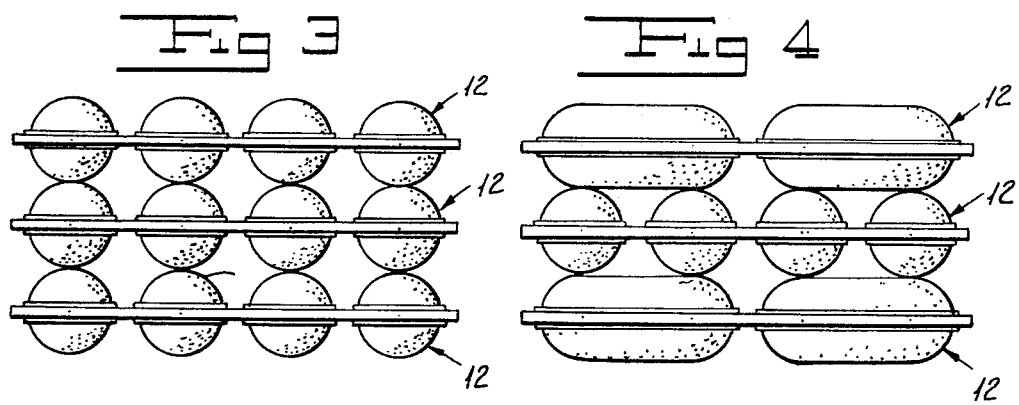
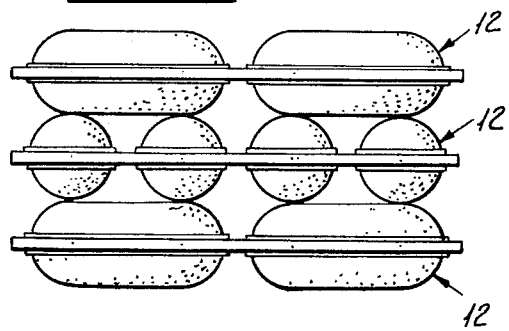
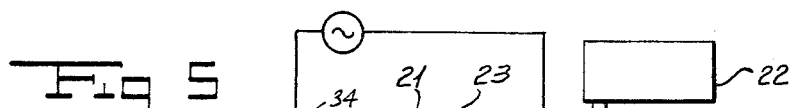
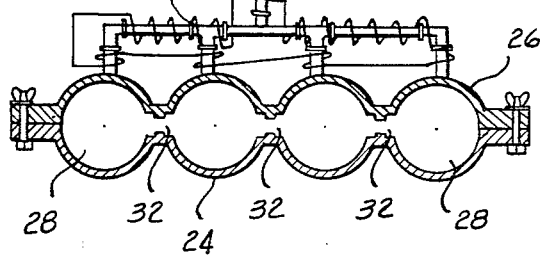
INVENTOR.
JOSEPH F. STEPHENS
BY
Shenier & O'Connor
ATTORNEYS

United States Patent Office 3,397,777
Patented Aug. 20, 1968

3,397,777
EMBOSSED SLAB OF GLUE
Joseph F. Stephens, Kansas City, Mo., assignor to Stephens Industries, Inc., Kansas City, Mo., a corporation of Missouri
Filed June 7, 1965, Ser. No. 461,950
11 Claims. (Cl. 206—65)

ABSTRACT OF THE DISCLOSURE

A unitary slab of hot melt adhesive in which a thin frangible web of said adhesive supports a plurality of generally cylindrical pellets of the adhesive in spaced relationship with the pellets arranged in rows and columns to permit a plurality of the slabs to be stacked with minimal contact between adjacent slabs. In use the pellets are broken from the slab and are of such a size as to permit them to be fed into melting apparatus.

My invention relates to the packaging of hot melt adhesives and more particularly to a novel packaging form for hot melt adhesives which facilitates their shipping, storing and handling.

Adhesives are widely used for applying inventory tickets and tags to a wide variety of packaging films, paper, tin plate and the like. The adhesives which are most satisfactory for these purposes are solid but tacky at room temperature and are known in the art as hot melt adhesives. The adhesive is applied to the ticket or the like by a machine or dispenser including a reservoir in which the adhesive is melted.

Manufacturers usually supply hot melt adhesive in containers of one gallon or larger size. The reservoir of a typical tagging machine or hot melt adhesive dispenser has only a small port through which it can be filled with adhesive. It is necessary, therefore, either to heat the adhesive so that it can be poured into the reservoir, or to break it into small pieces that will fit through the port.

Several unsatisfactory methods have been used in the prior art for getting the adhesive into the reservoir. Heating and pouring the adhesive is time-consuming and messy. Electrically heated scoops which melt their way through the solid adhesive have not been successful for a number of reasons. The process is slow and laborious, and if a heated scoop is accidentally allowed to stand on the adhesive, it melts its way down into the adhesive and its electrical components become fouled.

Another prior art expedient is molding the adhesive into pellets or fragmenting it into granules which will fit through the reservoir port. However, this apparently practical solution to a bothersome problem has not proved satisfactory. The best hot melt adhesives are tacky at room temperature and pellets or granules of these adhesives are difficult to package so that they do not stick together, thus forming a cohesive mass. Attempts have been made to package these pellets by coating each pellet or fragment with a silicon material or the like. Since it is not practical to remove these coatings immediately before use, coated pellets are fed into the reservoir. The coating contaminates the adhesive and is inimical to its desired adhesive properties.

I have invented a novel packaging form for hot melt adhesives which comprises orientated, rounded pellets formed in slabs which can be stacked with only point or line contact between them.

One object of my invention is to provide a hot melt adhesive packaging form which permits quick and easy loading of a tagging machine or dispenser reservoir without wasting adhesive.

Another object of my invention is to provide inexpensive packaging for hot melt adhesive pellets which avoids the problem of adhering the pellets and which does not deleteriously affect the desired characteristics of the adhesive.

A further object of my invention is to provide a packaging form for hot melt adhesives which permits discrete slabs of adhesive to be stacked for shipment at room temperature without separators.

Other and further objects of my invention will appear from the following description.

In general my invention contemplates the provision of a homogeneous waffle-like slab of hot melt adhesive comprising a plurality of pellets joined by an integral web of adhesive which can be readily broken to free individual or groups of pellets from the slab.

I make the pellets with a suitable geometric shape, such as cylindrical for example, so that I can stack slabs with only line or point contact between adjacent slabs, eliminating the need for separators.

In the accompanying drawings which form part of the instant specification and which are to be read in conjunction therewith and in which like reference numerals are used to indicate like parts in the various views:

FIGURE 1 is a perspective view of a plurality of hot melt adhesive pellets in my new packaging form.

FIGURE 2 is a sectional view of two pellets taken along the line 2—2 of FIGURE 1.

FIGURE 3 shows one way in which the slabs of packaged adhesive pellets shown in FIGURE 1 can be stacked in a container for shipment.

FIGURE 4 shows an alternate stacking arrangement for my embossed slab of glue.

FIGURE 5 is a diagrammatic view illustrating one method which can be used to form packaged adhesive pellets in accordance with my invention.

More particularly, referring now to the drawings, I form hot melt adhesive into a waffle-like slab generally indicated by the reference numeral 12. Slab 12 comprises a plurality of generally cylindrical adhesive pellets 14 interconnected by an integral planar web 16 of adhesive material. Each pellet 14, in a preferred embodiment, is about one inch long and ½ inch in diameter. Pellets of this size easily fit through the ports of most commercially used hot melt adhesive reservoirs.

I align the pellets 14 in straight rows and columns. The web 16 surrounding each of the pellets 14 is preferably about ¼ of an inch wide and ⅛ of an inch thick. A person desiring to detach a single pellet 14 or a group of pellets can easily do so by tearing the web 16 or cutting it with a pair of scissors, yet the slabs 12 are stiff at room temperature and can be easily handled.

Web 16 is centrally disposed with respect to pellets 14 so that there are raised, curved surfaces extending from both sides of the web. FIGURES 3 and 4 show two ways I can advantageously stack my packaged pellet slabs 12. Slabs 12 stacked as shown in FIGURE 3 contact only along the lines where the cylindrical pellets 14 from adjacent slabs are tangent. The total contact area between adjacent slabs is only about 15 percent of the total slab area.

In FIGURE 4 I show how I stack the slabs to reduce the total contact area still further. Adjacent slabs are crosswise with respect to one another and there are only points of contact between adjacent slabs. The total contact area is about 10 percent of the total slab area.

Although the adhesive may be tacky, if the slabs are stacked as I have shown in FIGURES 3 or 4, the total contact area is so small that they can be readily separated. There is no need to use a separator, such as a piece of wax impregnated paper, to separate the slabs.

It will be appreciated by those skilled in the art that the pellets 14 can be formed in other geometrical shapes besides cylindrical. For example, spherical or ellipsoidal pellets are satisfactory.

FIGURE 5 shows how I form the packaged pellet slabs 12. Copper tubing 21 connects a hopper 22 with a mold which comprises two separable halves 24 and 26. When joined, these two halves provide a plurality of pellet forming cells 28 interconnected by spaces 32 in which the web 16 forms. I preferably coat the inner surfaces of the mold with a suitable compound such as silicon to facilitate removal of the molded slabs.

The copper tubing 21 has a plurality of joints 34 to permit the tubes to be cleaned. I heat the copper tubing 21 to prevent solidification of the adhesive in the tubes by means of an induction heating coil 25 which surrounds the tubing and is connected to a source of high frequency electrical energy 27. As will be understood, the high frequency alternating magnet field in the coil induces eddy currents in the copper tubing thus to keep the glue at a sufficiently high temperature to permit it to flow freely.

I fill the hopper 22 with solid adhesive and heat it until it is a relatively free flowing liquid. I open valve 23 and inject the liquid adhesive through tubing 21 into a plurality of the cells 28, which have ports 29 through which air can escape. After the mold is full I shut off the adhesive from hopper 22 with a valve 23 and allow it to cool and solidify. When the adhesive is solid I separate the two halves of the mold and remove a slab of packaged adhesive pellets. The interior of the mold may be precoated with a suitable release agent.

In use of my embossed slabs of glue for shipment, the slabs 12 may be stacked in the manners shown in FIGURES 3 and 4. When the user desires to load the applicator or tagging machine, he manually separates a slab from the stack. The individual pellets can be torn or cut from the stack and dropped into the machine reservoir until the desired amount of glue has been supplied. The remainder of the slab can be returned to the stack which can be stored at room temperature without forming a cohesive mass until the next use.

The embodiment of my invention shown in FIGURES 1 through 5 is merely exemplary, and other configurations of the pellets 14 are satisfactory, as are other methods for forming the slabs 12. For example, the pellets can be formed with hemicylindrical portions coextensive with and extending from only one side of the web 16. Such a slab can conveniently be manufactured by melting the adhesive in an electrically heated vessel and then ladling it therefrom into open metallic molds. In practicing this method of forming slabs, I measure the quantity of glue to be poured into the mold in order to provide a web 16 of a suitable thickness, which may be about 1/16 inch.

Thus, it will be appreciated that I have accomplished the objects of my invention. My new packaging form fixes the adhesive pellets in a spaced apart relation so that they cannot stick together forming an inseparable mass of adhesive. My packaged pellets can be easily detached to load the adhesive reservoir and there is no waste or spilling of adhesive. I can stack several slabs of my pellets at room temperature without separation and they do not form an inseparable mass. My packaging is not inimical to the desired characteristics of the adhesive. My new method of packaging adhesive pellets is very inexpensive.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A slab of hot melt adhesive including a plurality of pellets of said adhesive disposed in aligned rows and columns and a thin readily partible web of said adhesive joining said pellets.

2. A unitary slab of hot melt adhesive including a plurality of generally cylindrical pellets disposed in aligned rows and columns and an integral thin readily partible web of said adhesive joining said pellets.

3. A package of hot melt adhesive comprising a plurality of hot melt adhesive pellets aligned in straight rows and columns, and an integrally formed readily partible planar web of hot melt adhesive surrounding each of said pellets.

4. A package of hot melt adhesive comprising a plurality of hot melt adhesive pellets formed with cylindrical portions aligned in straight rows and columns, and an integrally formed readily partible planar web of hot melt adhesive surrounding each of said pellets.

5. A unitary slab of hot melt adhesive including a thin readily partible web of said adhesive extending in two directions over an area and a plurality of pellets of said adhesive dispersed in both said directions throughout said area to provide peripheral pellets and central pellets, said web joining and supporting all of said pellets in spaced relationship, said web surrounding each of said central pellets.

6. A unitary slab as in claim 5 in which said pellets comprise hemicyclindrical portions extending from one side of said slab.

7. In a package of hot melt adhesive a plurality of stacked unitary slabs of said adhesive, each of said slabs comprising a thin readily partible web of said adhesive extending in two directions over an area and a plurality of pellets of said adhesive dispersed in both said directions throughout said area, said web joining and supporting all of said pellets, said pellets all having a regular geometric shape, the pellets of each web being arranged in a predetermined pattern whereby to provide minimal contact area between adjacent slabs of said stack.

8. In a package as in claim 7 in which said pellets are generally cylindrical to extend from both sides of said web and in which the pellets of a slab are arranged in a pattern of rows and columns.

9. In a package as in claim 7 in which said pellets are generally cylindrical to extend from both sides of said web, the pellets of each slab being arranged in rows and columns and the respective columns of adjacent slabs extending in different directions to provide substantially point contact between said adjacent slabs.

10. In a package as in claim 7 in which said pellets are generally cylindrical so as to extend from both sides of said web, the pellets of each slab being arranged in rows and columns, the columns of adjacent slabs extending in different directions, the length of the pellets of one slab being such as to span two pellets of an adjacent slab.

11. In a package as in claim 7 in which said pellets comprise hemicylindrical portions extending from one side of said web.

References Cited

UNITED STATES PATENTS

| 1,705,107 | 3/1929 | Durkee | 120—116 |
| 3,104,665 | 9/1963 | Towns | 206—63.2 X |
| 3,170,160 | 2/1965 | Burnistion | 206—56 |
| 3,196,229 | 7/1965 | Glass | 220—97 X |

FOREIGN PATENTS

| 342,967 | 2/1931 | Great Britain. |
| 1,194,371 | 5/1959 | France. |

JAMES B. MARBERT, *Primary Examiner.*